June 23, 1953  M. STUBNITZ  2,642,929
SEAT SPRING
Filed Aug. 19, 1948  5 Sheets-Sheet 1

INVENTOR.
Maurice Stubnitz
BY
Barnes, Kisselle, Laughlin & Raisch
ATTORNEYS

June 23, 1953  M. STUBNITZ  2,642,929
SEAT SPRING
Filed Aug. 19, 1948  5 Sheets-Sheet 2
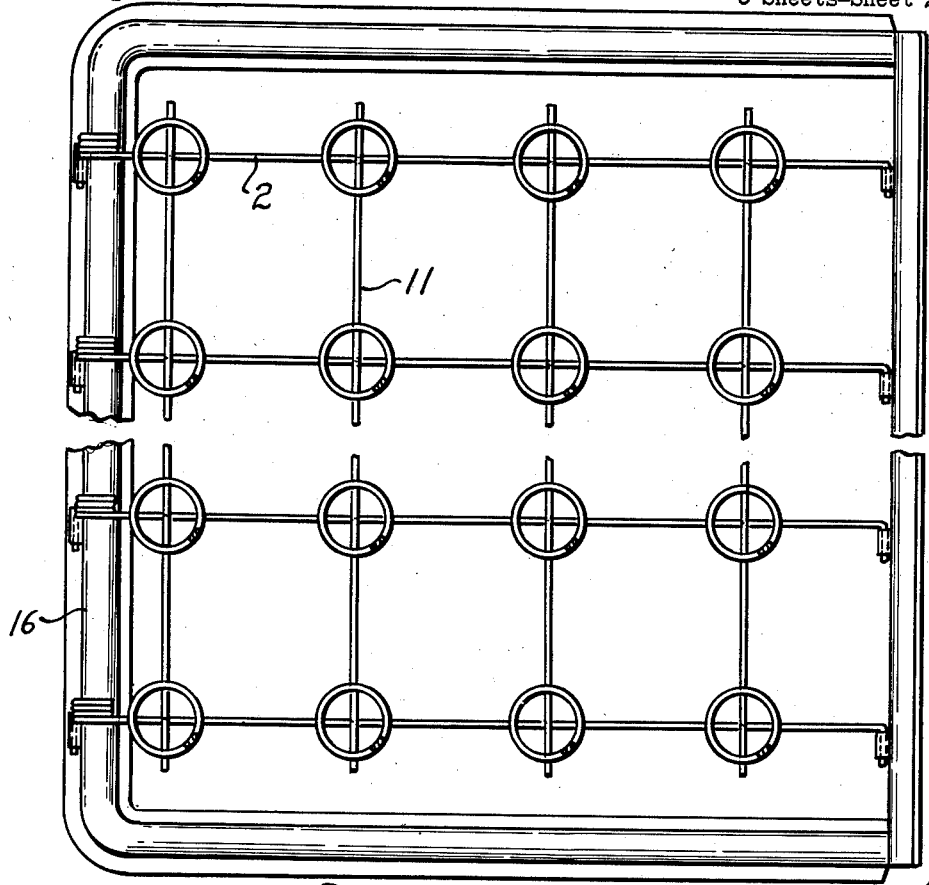
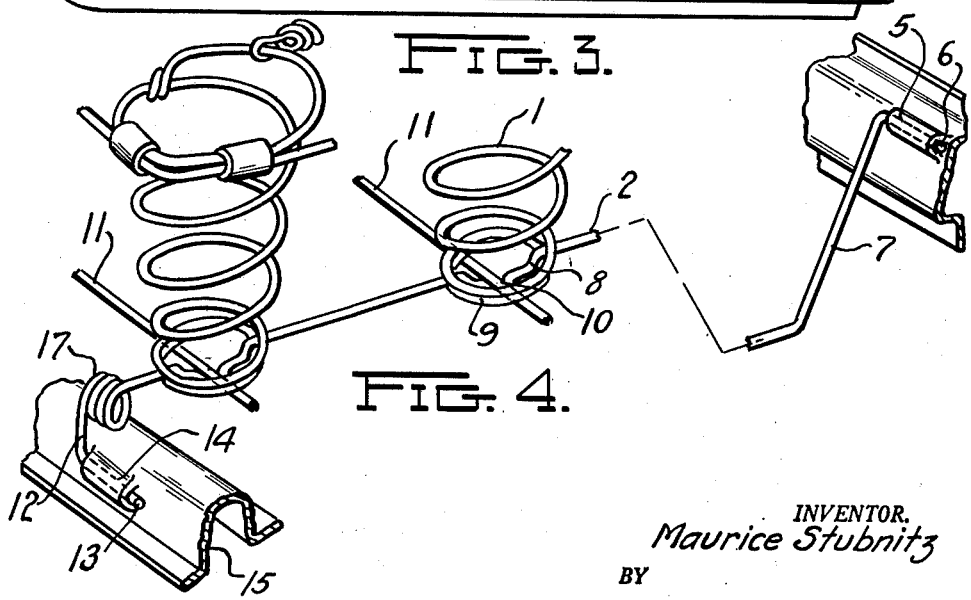
INVENTOR.
Maurice Stubnitz
BY
Barnes, Kisselle, Laughlin & Raisch
ATTORNEYS June 23, 1953  M. STUBNITZ  2,642,929
SEAT SPRING
Filed Aug. 19, 1948  5 Sheets-Sheet 3

INVENTOR.
Maurice Stubnitz
BY
Barnes, Kisselle, Laughlin & Raisch
ATTORNEYS

June 23, 1953    M. STUBNITZ    2,642,929
SEAT SPRING

Filed Aug. 19, 1948    5 Sheets-Sheet 4

INVENTOR.
Maurice Stubnitz
BY
Barnes, Kisselle, Laughlin, & Raisch
ATTORNEYS.

June 23, 1953  M. STUBNITZ  2,642,929
SEAT SPRING
Filed Aug. 19, 1948  5 Sheets-Sheet 5
FIG. 8.
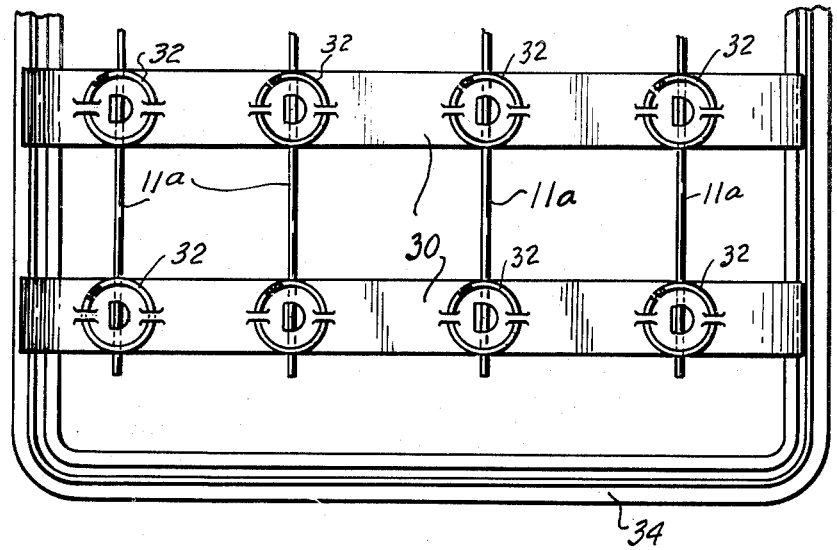
FIG. 9.
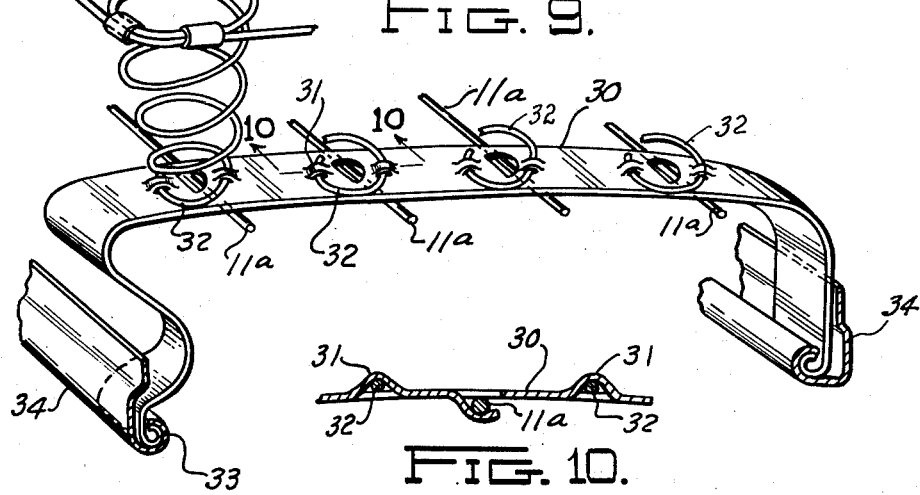
FIG. 10.
INVENTOR.
Maurice Stubnitz
BY
Barnes, Kisselle, Laughlin & Raisch
ATTORNEYS Patented June 23, 1953

2,642,929

UNITED STATES PATENT OFFICE 2,642,929

SEAT SPRING

Maurice Stubnitz, Adrian, Mich., assignor to Stubnitz-Greene Spring Corporation, Adrian, Mich., a corporation of Michigan Application August 19, 1948, Serial No. 45,175

9 Claims. (Cl. 155—179)

This invention relates to seat springs and has for its objective a seat spring requiring a minimum amount of material to lighten the weight of the seat spring and to achieve economy of construction.

Another objective of this invention is a seat spring which can be assembled on the job, that is, the parts of the seat spring are put together and assembled in the automobile body. This results in very substantial savings in transportation costs. Many of the automobile manufacturers today have assembly plants located in different parts of the country.

The spring manufacturer cannot have a spring assembly plant at every point where the automobile manufacturer has an assembly plant. Consequently the freight charge for shipping springs to distant parts of the country is quite an item. To keep down these costs there have been recently proposed various types of spring seats and spring seat backs employing wavy wire or zigzag wire springs. These bowed wavy wire springs are shipped loose to the automobile assembly plant. The seat bottom frame and seat back frame which is usually tubing is suitably perforated by the automobile manufacturer. He assembles the spring seat by hooking the wavy wire bowed springs into these frames. This results in manifest economy from the standpoint of both weight and cost, and results in a very considerable saving in shipping costs. On the other hand, these wavy wire spring seats have manifest disadvantages that have long been recognized. Some of the spring ribbons are likely to break and the seat cushion and seat back is obviously lacking in solid comfort which has heretofore been provided by the customary coil or hour glass type of supporting spring. Instead of a soft yieldable cushion one has a support more of the hammock type with an obvious limit to the stretching of the zig-zag wire ribbons and consequently a rather hard seat bottom and a rather hard seat back.

It is the object of the present invention to provide substantially the economy in weight, material, and transportation costs inherent in such wavy wire spring assemblies but at the same time utilize the old principle of the coil supporting spring supplemented by a yieldable base supporting coil springs of approximately half the usual length.

Referring to the drawings:

Figure 3 is a section taken on the line 3—3 of Figure 2.

Figure 4 is an enlarged detail of a fragment of the seat bottom spring.

Figure 8 is a fragmentary top plan view of another modified form of the invention.

Figure 9 is a fragmentary perspective of the modified form shown in Fig. 8.

Figure 10 is a section on the line 10—10 of Figure 9.

It will be understood that my invention can be carried out either in a seat bottom cushion or a seat back cushion, and I do not want to be limited to either, notwithstanding that I mention only one in the specification or claims.

Figure 1:
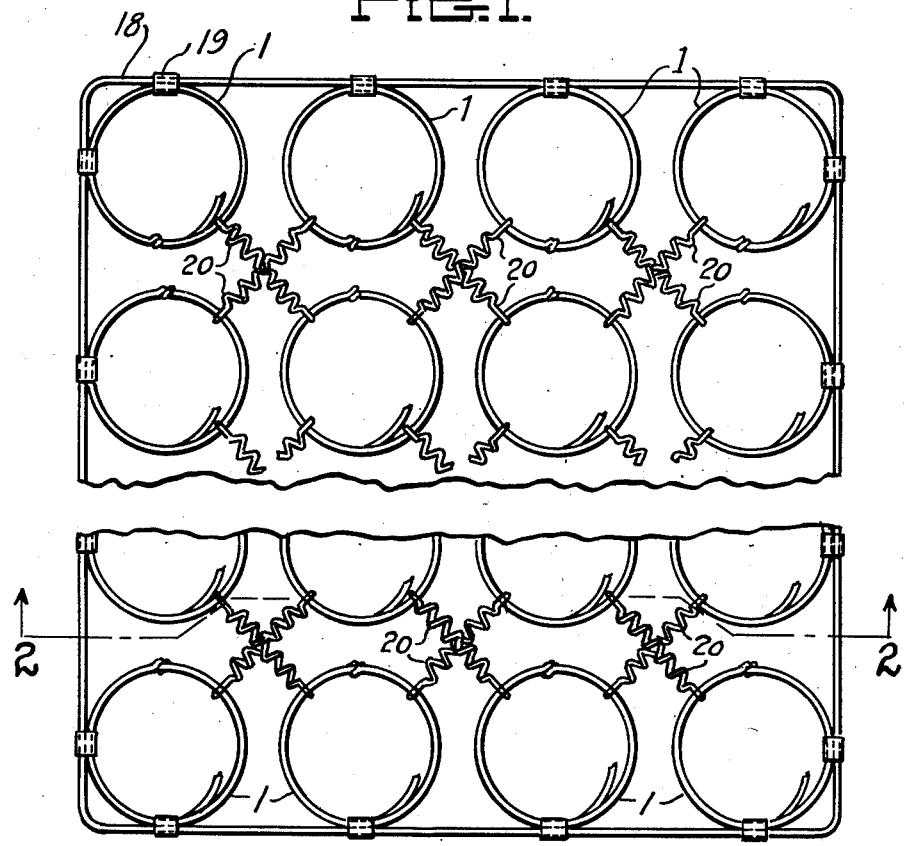
Figure 1 is a plan view of the seat bottom spring taken on line 1—1 of Fig. 2.
Figure 2:
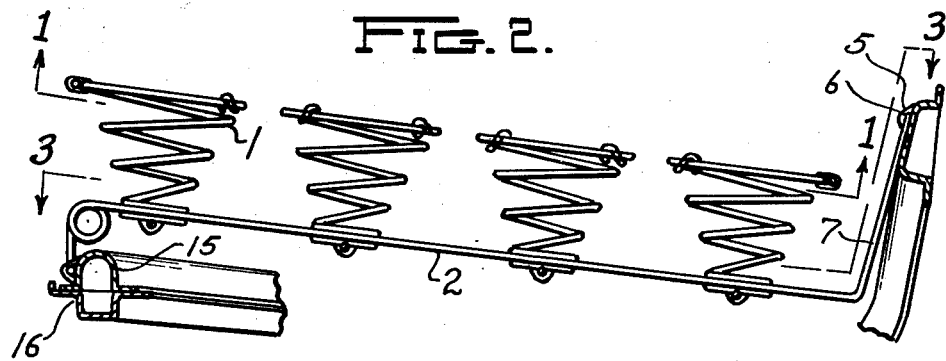
Figure 2 is a section taken on the line 2—2 of Figure 1 with the seat frame rails (fragmentarily shown) added.
Figure 6:
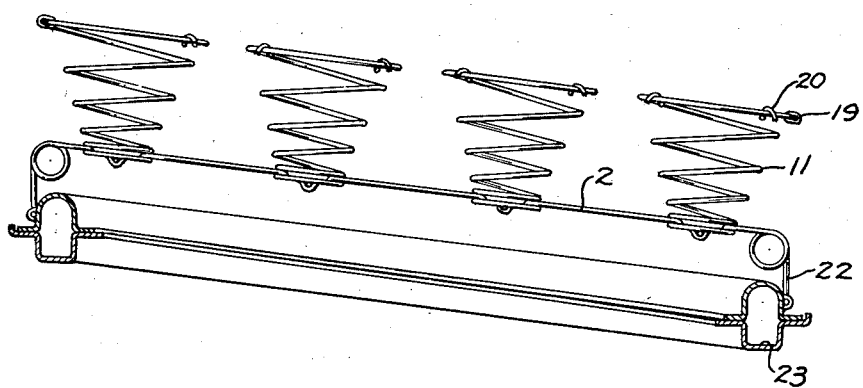
Figure 6 is a cross-section of a modified form of the invention.

The coil supporting springs 1 are of approximately half the usual length. They are supported on yieldable stringers 2. These stringers are hooked into the rear rail of the seat bottom frame. Struck out portions form an eye 5 in which the turned over end 6 may be hooked as shown in Figure 4. These turned over ends, when hooked into the eyes as shown in Fig. 4 and Fig. 6, may have a limited turning movement and hence can pivot to help in the yield of the base or deck, the turned over ends acting as trunnions in the pivoting action. The stringer 2 has a sling portion 7 which suspends the stringer from the rear rail 4 which is located above the top surface of the coil springs (see Figure 2). Each stringer 2 is off set with a compound offset 8 at the location of each coiled spring. The outside portion of the offset locates the lower coil 9 of spring 1 and the center offset 10 is arranged to locate and support the longitudinal wires 11. At the front each stringer 2, which is inclined slightly upward from front to rear as shown in Figure 2, has a leg 12 which is turned sharply downward and provided with a turned over hook portion 13 adapted to pass through the eye 14 struck out of the front rail 15 of the seat bottom frame. This rail has two flanged channels that are faced together as shown in Figure 2 to provide a tubular rail 16. Preferably the stringer wires are provided with one or more coils 17 where the stringer portion turns downwardly to form the leg. This forms a safety pin type of spring that gives a considerable yield.

The top whirls of the spring 1 are clipped to the top frame wire 18 by the usual clips 19. The top portions of the several springs 1 may be connected together by the coil connectors 20. Note from Figure 3 that the longitudinal wires 11 do not have their ends connected to any frame but the ends are free and the spring supporting base is free at the ends to move up and down within the limits permitted by the yield of the stringers 2. The yield of this supporting base which is quite substantial and quite free makes up for the deficiency in length of the coil supporting springs 1 and the total yielding effect of the springs and the yieldable base compares favorably with a seat cushion or seat back spring constructed with a solid base and springs of normal length. The employment of the short springs makes a very considerable saving in material cost as these tempered wire springs are the most expensive part of the seat cushion.

Figure 5:
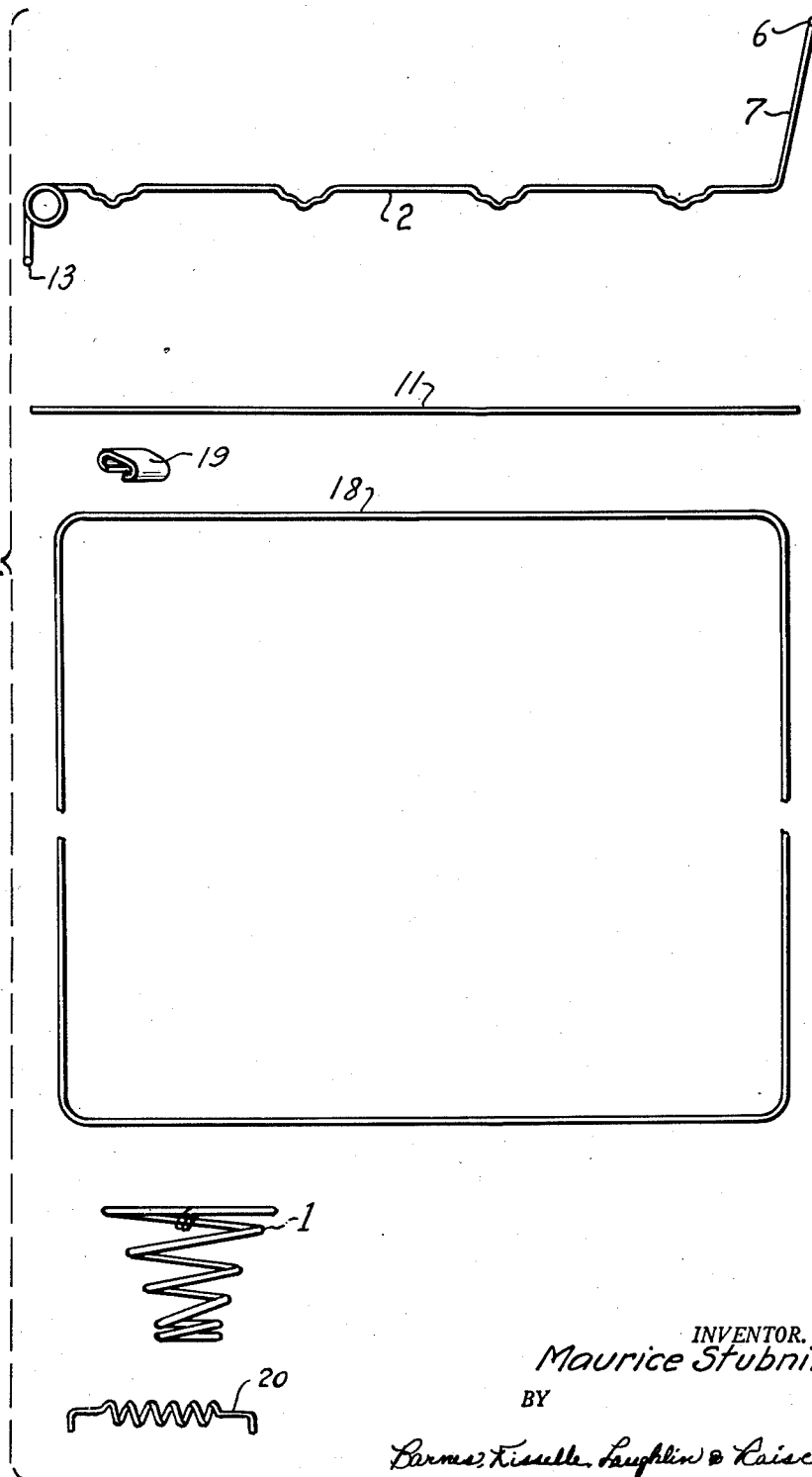
Figure 5 is a composite view showing the separate elements that go to make up the assembly which may be transported in knocked down condition.

The saving in transportation is accomplished by the assembly on the job as heretofore explained. This is accomplished by shipping the parts all in knocked down condition as shown in the composite Figure 5. The automobile manufacturer hooks the wire stringers 2 into the eyes 4 and 5 of the front and rear tubes respectively of the seat frame. He then assembles the short coil springs 1 by setting one in each compound offset 8 of the stringer 2 with the lower coil 9 of the spring 1 on the outside of the compound offset 8 as shown in Figure 4, then the longitudinal or locking wire 11 is threaded over the lower coil and above the center offset 10 of each compound offset thereby locking the base of each spring of a line in place. Each line of springs is assembled in this fashion. Or the most expedient way to make assembly is to lay the longitudinal wires in the depressions in the stringers and then twist or screw the springs in place as shown and described in the D'Arcy Patent 803,561 of November 7, 1905, and in the Staples Patent 813,923 of February 27, 1906. Thereupon the top wire frame 18 is fitted in place and the clips 19 clip the top coil of each short spring 1 to the upper frame 18. The clip or hog ring 19 can be clamped in place by a suitable clinching tool. Stapling or hog ring tools are now to be had in which the clips are automatically fed to a power operated clinching tool and the clips can thereby be handled very rapidly and the springs fastened in place with speed and ease. The coil spring connectors 20 can then be easily hooked in place. Thus the assembly is completed.

Figure 6 shows a modified form of the invention in which in place of the sling, the rear of the stringer is supported from a leg 22 of the safety spring type. This hooks into a rear rail 23 formed by two flanged channels. This rail 23, in contradistinction to the rear rail shown in the preceding figures, is below the coils 1 and stringers 2.

Figure 7:
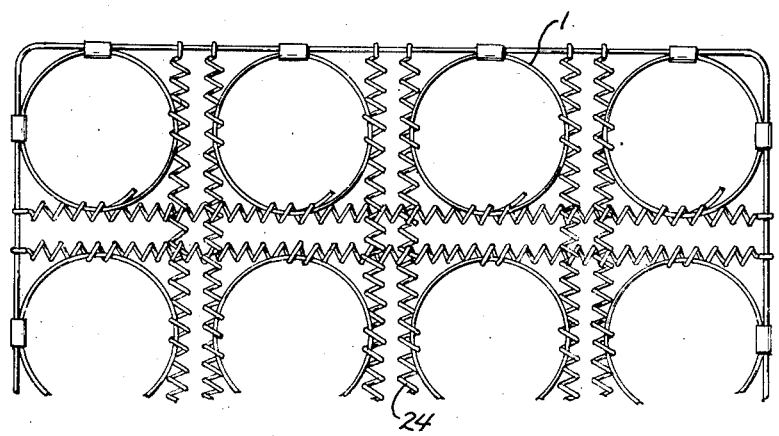
Figure 7 is a fragmentary plan view of a modified form of the invention.

The top coils of spring 1 in Figure 7 are connected by coiled connectors 24 which are laced through the coils and through each other.

In the modified form shown in Figures 8, 9, and 10, the stringers are in the form of spring looped ribbons 30 having eyes 31 struck out of the ribbons to receive the lowest coil 32 of the supporting springs 1 which may be turned and threaded through the eye 31. The spring frame is the seat frame mounted in the body. Here the seat frame is made up of a rail 34 of J cross section. The rolled over end 33 of the spring stringer ribbon is pinched into the lower portion of the J section by a pinching tool. Longitudinal wires 11a are connectors between the ribbon stringers and like the locking wires 11 in Figure 3, are free at their ends.

What I claim is:

1. A seat spring having in combination a frame, flexible stringers supported on the frame and arranged to yield and provide a yieldable spring support, short coil springs supported on the yieldable stringers, an upper frame member to which the upper portions of the coil springs are connected, connectors for the upper portions of the coil springs, and means for connecting the stringers together and for locking the lower portions of the springs to the stringers to seat said coil springs, the said stringers comprising each a flexible spring wire having at the rear a sling portion, the stringer running forward in an inclined direction upwardly and then turned sharply downward to form a yieldable leg.

2. A seat spring having in combination a frame, flexible stringers supported on the frame and arranged to yield and provide a yieldable spring support, short coil springs supported on the yieldable stringers, an upper frame member to which the upper portions of the coil springs are connected, connectors for the upper portions of the coil springs, and means for connecting the stringers together and for locking the lower portions of the springs to the stringers to seat said coil springs, each yieldable stringer comprising at the rear a sling which suspends the stringer from a point above the upper surface of the supporting springs, said stringer running forward below the supporting spring and then turning sharply downward forming one or more coils and a yieldable leg portion.

3. A seat spring having in combination a rail type metal supporting frame for fastening to an automobile body, said frame having struck out eye portions, yieldable stringers having turned over ends hooked into the eye portions at the front and rear rails of the frame, relatively short coil supporting springs secured to the stringers by means of locking wires threaded over the stringers and through the lower coil of the springs, said wires having free ends, an upper frame to which the supporting springs are clipped and connectors between the springs at the upper ends thereof, each yieldable stringer having an upgoing portion at the rear forming a sling, offset portions through which the locking wires are threaded, and a sharply bent downward portion at the front forming a yieldable leg.

4. A seat spring having in combination a rail type metal supporting frame for fastening to an automobile body, said frame having struck out eye portions, yieldable stringers having turned over ends hooked into the eye portions at the front and rear rails of the frame, relatively short coil supporting springs secured to the stringers by means of locking wires threaded over the stringers and through the lower coil of the springs, said wires having free ends, an upper frame to which the supporting springs are clipped and connectors between the springs at the upper ends thereof, each yieldable stringer having an upgoing portion at the rear forming a sling, offset portions through which the locking wires are threaded, and a sharply bent downward portion at the front forming a yieldable leg, said leg having one or more coils of the safety pin type to increase the yield of the stringer.

5. A seat spring having in combination a rail type metal supporting frame for fastening to an automobile body, said frame having struck out eye portions, yieldable stringers having turned over ends hooked into the eye portions at the front and rear rails of the frame, relatively short coil supporting springs secured to the stringers by means of locking wires threaded over the stringers and through the lower coil of the springs, said wires having free ends, an upper frame to which the supporting springs are clipped and connectors between the springs at the upper ends thereof, each yieldable stringer having an upgoing portion at the rear forming a sling, offset portions through which the locking wires are threaded, and a sharply bent downward portion at the front forming a yieldable leg, each stringer having at the location of each supporting spring a compound offset portion, the outside of the offset portion locating the lower coil of each spring and the center offset portion locating and seating the locking wire which is threaded over the lower coil of each spring.

6. A double deck spring cushion made up of two sections, one section overlying the other section, the upper section having in combination an upper border frame and a plurality of longitudinal and cross rows of load-carrying short helical conical springs of length corresponding to the depth of the upper section and of substantially reduced length as compared to the depth of the cushion, the conical springs gradually reduced in flexibility from the larger to the smaller diameter end by reason of the reduction of the size of the turns, said load-carrying springs having their upper and lower ends substantially spaced from one another but the upper ends yieldably tied together and the upper turns of the outer springs of the longitudinal and cross rows secured to the border frame to form an upper deck yieldable by the partial compression and tipping of the upper portions of the load-carrying springs in support of and in conformation to the portion of the body in contact with the cushion, the lower section having a plurality of spring wire stringers extending crosswise of the cushion under each cross row of load-carrying springs, and each stringer having at least at one end a hinge in the form of a spring wire leg free of any connection or contact except a bent over end for resting in a socket in a frame when the spring cushion is assembled, and longitudinal wires running at right angles to the stringers, one with each longitudinal row of load-carrying springs and intersecting the stringer wires at the narrow end of each load-carrying spring, the said turns of the narrower ends of the springs interlaced with the intersecting wires to firmly anchor and lock the load-carrying springs to the intersecting wires coaxially with the intersections and also to lock the intersecting wires together to form the lower deck, the said longitudinal wires having ends that are free from connection with the said frame when assembled to thereby form a floating deck, the said stringers having extensions including the said wire legs for holding the floating deck in spaced but yieldable relation with respect to the frame when the parts are assembled in the frame.

7. The combination claimed in claim 6 in which the spring wire legs on at least one end of the stringers are safety pin type springs.

8. The combination claimed in claim 6 combined with a metal seat frame provided with tunnels in which the turned over ends of the spring wire legs rest so that the spring wire legs can pivot on the turned over ends of the legs which act as trunnions.

9. The combination claimed in claim 6 in which each stringer has a safety pin type spring at each end with turned over ends which can be supported in a frame to act as trunnions to allow the spring legs to pivot on the frame.

MAURICE STUBNITZ.

References Cited in the file of this patent

UNITED STATES PATENTS

| Number | Name | Date |
| --- | --- | --- |
| 604,368 | Cloyes | May 24, 1898 |
| 611,131 | Leggett | Sept. 20, 1898 |
| 742,251 | Staples | Oct. 27, 1903 |
| 803,933 | Smith | Nov. 7, 1905 |
| 813,923 | Staples | Feb. 27, 1906 |
| 1,051,466 | Travis | Jan. 28, 1913 |
| 1,067,193 | Phelps | July 8, 1913 |
| 1,866,664 | Munn | July 12, 1932 |
| 2,125,519 | Oldham | Aug. 2, 1938 |

FOREIGN PATENTS

| Number | Country | Date |
| --- | --- | --- |
| 40,564 | France | Apr. 19, 1932 |
| | (Addition to No. 673,637) | |
| 228,253 | Great Britain | Jan. 30, 1925 |